United States Patent
Ying et al.

(10) Patent No.: US 7,999,500 B1
(45) Date of Patent: Aug. 16, 2011

(54) CALIBRATING SPINDLE MOTOR CONTROLLERS

(75) Inventors: Edward Ying, Berkeley, CA (US); Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 383 days.

(21) Appl. No.: 12/192,901

(22) Filed: Aug. 15, 2008

Related U.S. Application Data

(60) Provisional application No. 60/956,234, filed on Aug. 16, 2007.

(51) Int. Cl.
  *G05D 23/275* (2006.01)
(52) U.S. Cl. ............... 318/632; 318/400.04; 318/811
(58) Field of Classification Search .......... 318/632, 318/400.04, 811, 430, 400.11, 400.35, 400.12, 318/400.34, 701
See application file for complete search history.

(56) References Cited

U.S. PATENT DOCUMENTS

| | | |
|---|---|---|
| 5,631,999 A | 5/1997 | Dinsmore |
| 5,687,036 A | 11/1997 | Kassab |
| 5,808,440 A | 9/1998 | Bennett et al. |
| 5,818,179 A | 10/1998 | Kokami et al. |
| 5,869,946 A | 2/1999 | Carobolante |
| 5,878,015 A * | 3/1999 | Schell et al. ............ 369/116 |
| 5,982,130 A | 11/1999 | Male |
| 6,078,158 A | 6/2000 | Heeren et al. |
| 6,084,364 A | 7/2000 | Menegoli |
| 6,163,118 A | 12/2000 | Chen et al. |
| 6,163,120 A | 12/2000 | Menegoli |
| 6,476,996 B1 | 11/2002 | Ryan |
| 6,493,169 B1 | 12/2002 | Ferris et al. |
| 6,498,446 B1 | 12/2002 | Menegoli et al. |
| 6,563,666 B1 | 5/2003 | LaPanse |
| 6,566,832 B2 | 5/2003 | Ataee |
| 6,577,088 B2 | 6/2003 | Heydt et al. |
| 6,650,082 B1 | 11/2003 | Du |
| 6,754,151 B2 | 6/2004 | Watt |
| 6,775,091 B1 | 8/2004 | Sutardja |
| 6,940,685 B2 * | 9/2005 | Chrappan Soldavini et al. ............ 360/78.06 |
| 7,209,312 B1 | 4/2007 | Sutardja |
| 7,378,810 B1 | 5/2008 | Sutardja et al. |
| 2002/0136127 A1 | 9/2002 | Watt |

* cited by examiner

*Primary Examiner* — Karen Masih

(57) ABSTRACT

Methods, systems, and apparatus, including computer program products, are described for calibrating spindle motor controllers. In one aspect, a method is provided that includes receiving a compensator output from a spindle motor controller that compensates for variations in a velocity of an associated spindle motor, and filtering the compensator output to compensate for a spindle motor system pole and produce a high frequency roll-off.

21 Claims, 6 Drawing Sheets

CALIBRATING SPINDLE MOTOR CONTROLLERS

CROSS-REFERENCE TO RELATED APPLICATIONS

This application claims priority to U.S. Provisional Application Ser. No. 60/956,234, for "High Bandwidth Disk-Drive Spindle Motor Control Method," filed on Aug. 16, 2007, which is incorporated by reference herein in its entirety.

TECHNICAL FIELD

The subject matter of this patent application relates to signal processing.

BACKGROUND

Conventional spindle motor systems (e.g., including a spindle motor controller) are closed-looped systems that use feedback sources to regulate variations in the velocity of a spindle motor as it tracks a target velocity. The spindle motor systems can be used, for example, in hard disk drives. Servo sector timing marks and back-electromotive-force (BEMF) timing marks from spindle motor windings can be used as feedback sources for control loops (e.g., a frequency-locked-loop (FLL), a phase-locked-loop (PLL)) associated with the spindle motor controller. In conventional systems, servo sector timing marks are not available during a self-servo-write (SSW) process because the servo sector timing marks are not yet written. Therefore, during SSW processes feedback from BEMF pulses can be used to determine spindle motor speed characteristics.

Conventional control loops include low frequency electrical system poles. The low frequency electrical system poles limit the bandwidth of the control loop. Low bandwidth can result in low frequency non-repeatable errors and a slow transient response. A user might find it difficult to use the conventional control loops for high precision applications, such as accurate writing of servo marks on blank disk media in a SSW process. On the other hand, high bandwidth is particularly important for smaller form factor hard disk drives due to a smaller disk diameter and a resultant lower inertia of the rotating disk.

SUMMARY

Methods, systems, and apparatus, including computer program products, are described for calibrating spindle motor controllers.

In one aspect, a method is provided that includes receiving a compensator output from a spindle motor controller that compensates for variations in a velocity of an associated spindle motor, and filtering the compensator output to compensate for a spindle motor system pole and produce a high frequency roll-off. Other embodiments of this aspect include corresponding systems, apparatus, and computer program products.

One or more implementations can optionally include one or more of the following features. The spindle motor controller can include a phase-locked-loop (PLL). The spindle motor controller can include a frequency locked loop (FLL). Filtering can include using a zero to cancel an existing spindle motor system pole, and a pole selected to provide high frequency roll-off.

In another aspect, a method is provided that includes detecting a reference signal; determining timing information from the reference signal; comparing the timing information to target timing information to determine an error; compensating a control signal using the error; and processing the compensated control signal using a filter that includes a zero to cancel a spindle motor system pole, and a pole selected to provide high frequency roll-off. Other embodiments of this aspect include corresponding systems, apparatus, and computer program products.

One or more implementations can optionally include one or more of the following features. The method can further include determining a zero to cancel the system pole, and determining the high frequency pole. Processing the compensated control signal can increase a precision and a bandwidth of a plant transfer function, and the plant transfer function can be based on the filtered control signal, where the plant is a spindle motor. The reference signal can include back-electromotive-force pulses from a spindle motor. The timing information can include timing mark intervals and the target timing information can include target timing mark intervals. The timing mark intervals and the target timing mark intervals can define velocity. The timing information can include timestamps and the target timing information can include expected target phases. The timestamps and expected target phases can define frequency.

In another aspect, a filter is provided that includes a spindle motor; a detector to detect a reference signal and determine timing information from the reference signal; a comparator to compare the timing information to target timing information to determine an error; a compensator to compensate a control signal using the error; and a filter, to process the compensated control signal, that includes a zero to cancel a spindle motor system pole and a pole selected to provide high frequency roll-off. Other embodiments of this aspect include corresponding systems, methods, and computer program products.

In another aspect, a system is provided that includes a spindle motor; a detector to detect a reference signal and determine timing information from the reference signal; a comparator to compare the timing information to target timing information to determine an error; a compensator to compensate a control signal using the error; and a filter, to process the compensated control signal, that includes a zero to cancel a spindle motor system pole and a pole selected to provide high frequency roll-off. Other embodiments of this aspect include corresponding methods, apparatus, and computer program products.

One or more implementations can optionally include one or more of the following features. The system can further include a spindle motor controller that includes a phase locked loop (PLL). The system can further include a spindle motor controller that includes a frequency-locked-loop (FLL). The filter can include a zero to cancel an existing spindle motor system pole, and a pole selected to provide high frequency roll-off. The filter can process the compensated control signal to increase a precision and a bandwidth of a plant transfer function, and the plant transfer function can be based on the filtered control signal, where the plant is the spindle motor. The detector can detect back-electromotive-force pulses from the spindle motor. The comparator can compare timing mark intervals to target timing mark intervals, and the timing mark intervals and the target timing mark intervals can define velocity. The comparator can compare timestamps and expected target phases, and the expected target phases can define frequency.

Particular embodiments of the subject matter described in this specification can be implemented to realize none, one or more of the following advantages. Calibrating a spindle motor controller can increase the accuracy and precision of a SSW process, for example, by (i) increasing a bandwidth of the spindle motor controller; and (ii) increasing a precision of the spindle motor controller by reducing velocity and phase variations and decreasing a transient response of the spindle motor controller.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
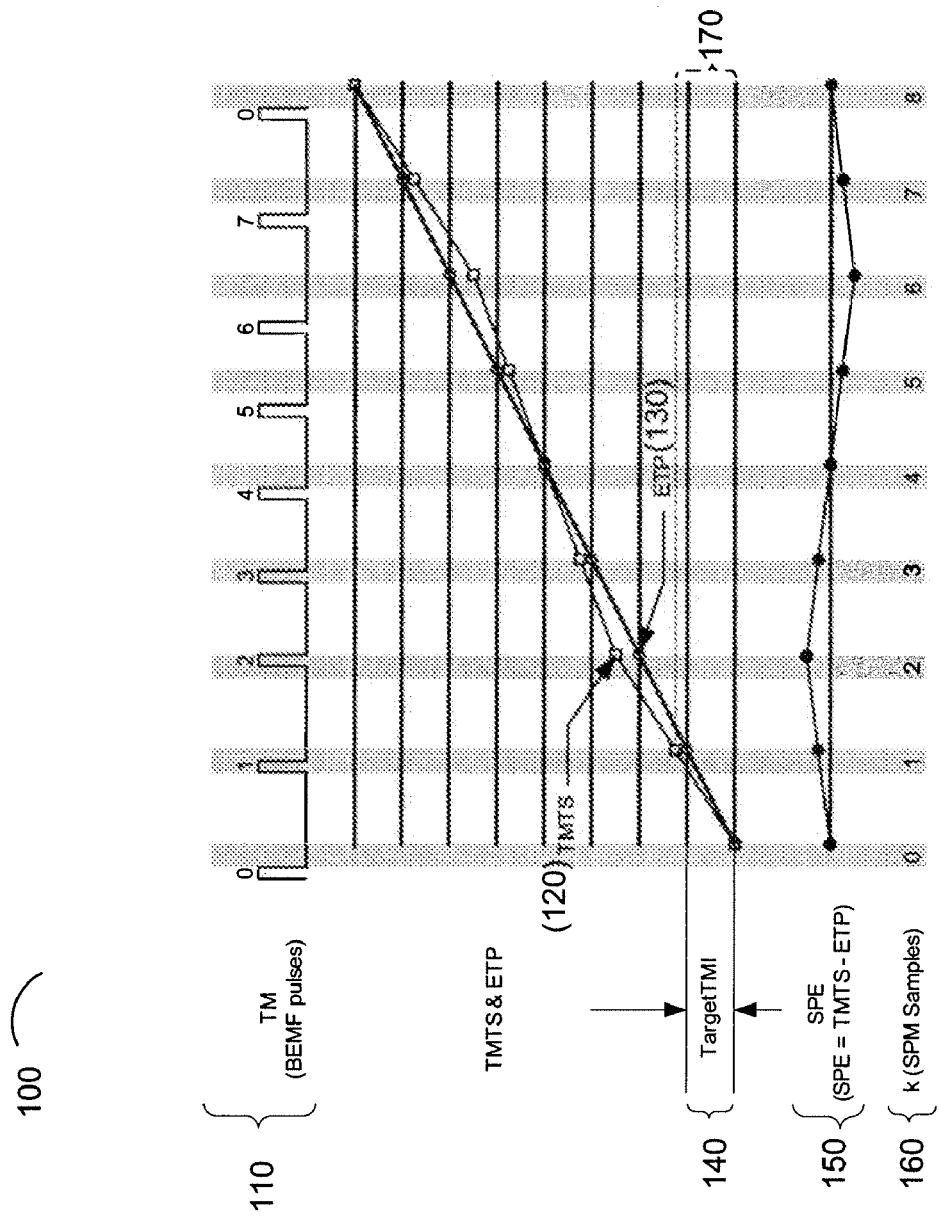
FIG. 1 is a diagram that includes example timing and phase information.

FIG. 1 is a diagram 100 that includes example timing and phase information. The diagram 100 includes timing marks 110 (e.g., BEMF pulses), timing mark timestamps 120, expected target phases 130, target timing mark intervals 140, spindle motor phase errors 150, and indices for spindle motor samples 160. The x-axis of the diagram 100 represents the indices for spindle motor samples 160. The y-axis of the diagram 100 represents time (e.g., microseconds). The diagram 100 includes timing and phase information for a spindle motor that generates eight timing marks 110 per revolution. Other configurations are possible.

The timing marks 110 can be detected and the timing mark timestamps 120 are used to indicate a time at which each timing mark 110 occurred. Errors in the phase of the timing marks 110 can cause the timing marks 110 to occur and be detected at intervals (e.g., timing mark intervals 170) different from the target timing mark intervals 140. For example, BEMF pulses 0 and 4 can represent timing marks 110 with no phase error (e.g. timing marks at ideal positions of a sample). As other examples, BEMF pulses 1, 2, and 3 can represent timing marks 110 with positive phase errors (e.g., timing marks shifted to the right in time). As other examples, BEMF pulses 4, 5, 6, and 7 can represent timing marks 110 with negative phase errors (e.g., timing marks shifted to the left in time).

For each sample, a spindle motor phase error 150 can be calculated by subtracting the expected target phase 130 from a corresponding timing mark timestamp 120. The calculation can be expressed by the equation:

$$SPE(k)=TMTS(k)-ETP(k);$$

where SPE is a spindle motor phase error 150, TMTS is a timing mark timestamp 120, ETP is the expected target phase 130, and k is an index for the spindle motor sample 160.

The expected target phase 130 can be expressed as:

$$ETP(k)=ETP(k-1)+TargetTMI, \text{ where } k>=0;$$

where TargetTMI is a target timing mark interval 140. In some implementations, spindle motor phase error 150 can be calculated from an integral of error between a timing mark interval and a target timing mark interval 140. For example, a target timing mark interval 140 between a first sample (e.g., k=0) and a second sample (e.g., k=1) can be compared to the timing interval 170 to determine a spindle motor timing error (not shown).

In some implementations, a spindle motor control system includes a FLL that uses the timing and phase information to regulate velocity variations in a spindle motor. In the FLL, timing mark intervals can be locked to the target timing mark intervals 140. The target timing mark intervals 140 can be inversely proportional to a target frequency or a target velocity. Locking the timing mark intervals to the target timing mark intervals 140 allows the spindle motor to track a fixed, target velocity.

In some implementations, a spindle motor control system includes a PLL that uses the timing and phase information to regulate velocity variations in a spindle motor. In the PLL, timing mark timestamps 120 can be locked to expected target phases 130. In some implementations, the timing mark timestamps can be generated by a modulo counter in a spindle motor clock. Locking the timing mark timestamps 120 to expected target phases 130 can also lock the PLL to a target frequency.

Timing errors determined from the timing and phase information can be used to compensate for the variations in a velocity of a spindle motor.

Figure 2:
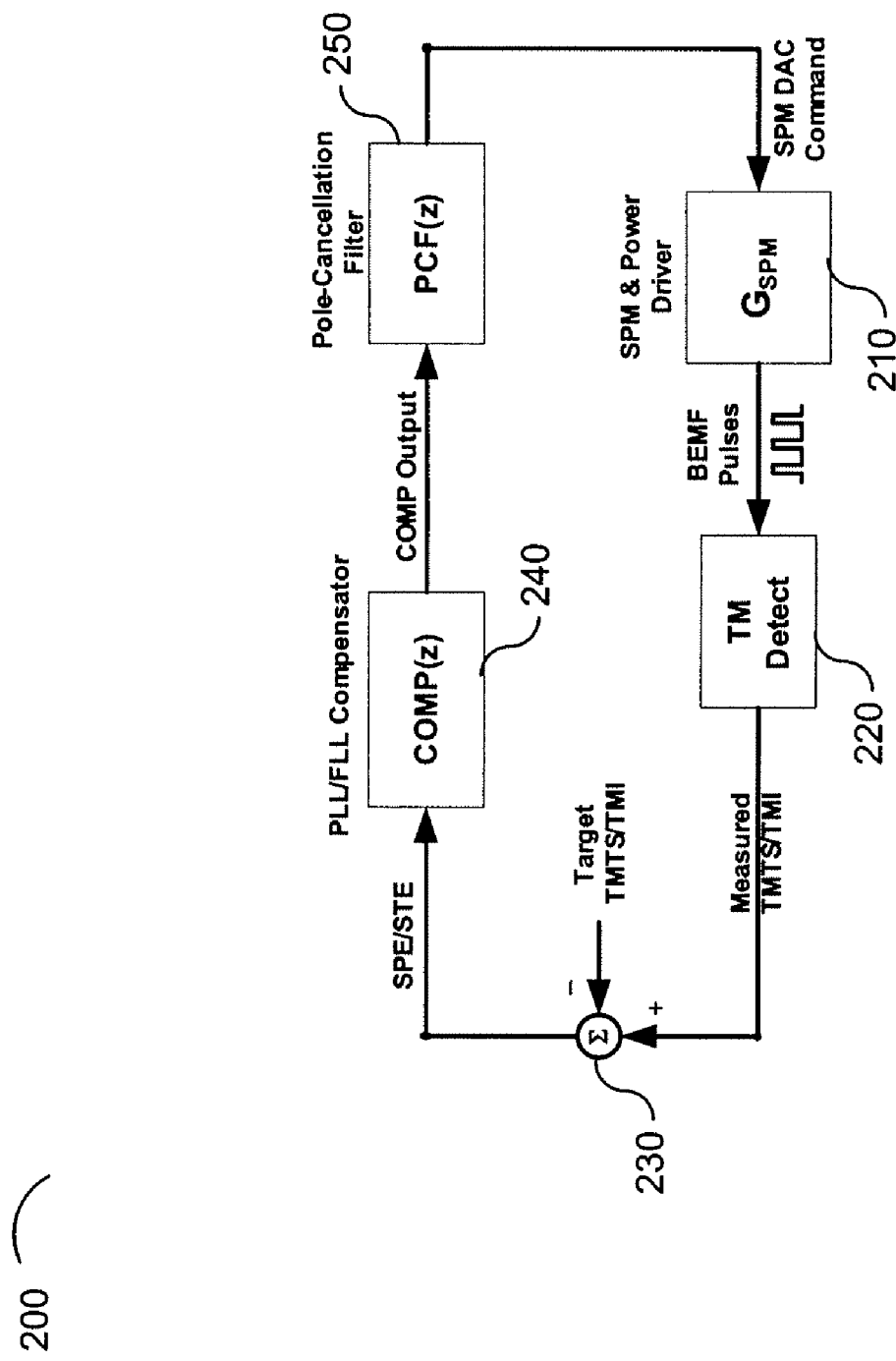
FIG. 2 is a conceptual block diagram of an example spindle motor control system.

FIG. 2 is a conceptual block diagram of an example spindle motor control system 200. The spindle motor control system 200 includes a spindle motor 210, a detector 220, a comparator 230, a compensator 240, and a filter 250.

A detector 220 (e.g., a timing mark detector) can detect BEMF pulses from the spindle motor 210. The detector can use the BEMF pulses as timing marks to generate timing mark timestamps (TMTS). The timing mark timestamps can also be used to define timing mark intervals (TMI). The comparator 230 compares the timing mark timestamps and timing mark intervals to corresponding target values to determine spindle motor phase errors and spindle motor timing errors, respectively. For example, the comparator 230 can subtract the target timing mark timestamps from the timing mark timestamps, and the comparator 230 can subtract the target timing mark intervals from the timing mark intervals, to determine the errors.

A compensator 240 can use the errors (e.g., phase errors, timing errors) to correct the error between the timing mark timestamps and timing mark intervals and their corresponding target values by calculating and outputting a corrective action (e.g., a compensated signal) to adjust the spindle motor 210.

For example, in a FLL, the compensator 240 can use a proportional-integral-derivative (PID) style compensation algorithm. The compensator 240 can use the spindle motor timing error to correct the error between the measured timing mark interval and the target interval. As another example, in a PLL, the compensator 240 can use a proportional-integral (PI) compensation algorithm. The compensator 240 can use the spindle motor phase error to correct the error between the measured timing mark timestamp and the expected target phase.

A filter 250 can be used to process (e.g., filter) output of the compensator 240 to compensate for variations in a velocity of the spindle motor 210. The filter 250 can produce a magnitude and phase shifted control signal (e.g., spindle motor command) for the spindle motor 210. The filter 250 can be, for example, a unity gain first order filter that includes a zero that cancels a spindle motor system pole and a pole selected to provide high frequency roll-off. The filter can be used to transform a plant (e.g., a spindle motor) with a low-frequency system pole to an improved plant with a selectable high frequency pole.

As an example design for the spindle motor control system 200, the spindle motor 210 can have a corresponding transfer function $G_{SPM}(s)$ defined by the following equation:

$$G_{SPM}(s) = \frac{\theta}{u} = \frac{K_T/(J \cdot R)}{s \cdot (s+\lambda)}, \quad \text{where } \lambda = \frac{K_T^2}{J \cdot R};$$

where $\theta$ is a phase, u is a spindle motor voltage, $\lambda$ is a system pole, $K_T$ is a torque factor (N-m/amp), R is a spindle motor resistance ($\Omega$), J is a spindle motor inertia (Kg-m/sec$^2$), s is a continuous-time operator, z is a discrete-time operator, and T is a control interval time (sec).

The filter 250 (PCF(z)) can be represented, for example, by the following equation:

$$PCF(z) = pcfGain \cdot \frac{z - pcfZero}{z - pcfPole};$$

where pcfPole is a discrete-time pole tuned to provide high frequency roll-off, and pcfZero is a discrete-time zero that cancels the system pole 2. For example, pcfZero can be expressed as:

$$pcfZero = e^{-\lambda T}.$$

Furthermore, the filter 250 can have unity gain. Unity gain can be achieved when the gain of the filter (pcfGain) is defined as in the following equation:

$$pcfGain = \frac{1 - pcfZero}{1 - pcfPole}.$$

A target timing mark interval $\tau_r$ can be represented by the following equation:

$$\tau_r = (F_r n_w n_p/2)^{-1};$$

where $F_r$ is a target spindle motor frequency, $n_w$ is a number of windings in the spindle motor, and $n_p$ is a number of poles.

For a control sample k, where k>0, a spindle motor phase error (SPE(k)) can be calculated from a timing mark $\tau_m$ and a target timing mark interval $\tau_r$ using the following equation:

$$SPE(k) = \left[\sum_{i=1}^{k} \tau_m(i)\right] - k \cdot \tau_r.$$

Alternatively, the spindle motor phase error can be calculated from the integral of the spindle motor timing error using the equation:

$$SPE(k) = \sum_{i=1}^{k} [\tau_m(i) - \tau_r].$$

The compensator 240 can use a compensation algorithm (e.g., a PI compensation algorithm) that includes an update integral for the integral term of the compensation algorithm. The update integral can be represented by the following equation:

$$intSPE(k) = intSPE(k-1) + SPE(k);$$

where intSPE(k) represents an integral of a spindle motor phase error for a sample k.

The compensator 240 can calculate a compensated output. For example, a PLL output (pllOutput(k)) can be represented by the following equation:

$$pllOutput(k) = proportionalGain \cdot SPE(k) + integralGain \cdot intSPE(k);$$

where proportionalGain is the gain of the proportional term of the compensation algorithm, and integralGain is the gain of the integral term of the compensation algorithm.

The filter 250 can process the compensated output and produce a control signal (spmCommand(k)). The control signal can be represented by the following equation:

$$spmCommand(k) = pcfPole \cdot spmCommand(k-1) + pcfGain \cdot [pllOutput(k) - pcfZero \cdot pllOutput(k-1)].$$

In some implementations, the control signal can be sent to a spindle motor digital-to-analog converter (DAC) for further processing before being sent to the spindle motor 210.

Figure 3:
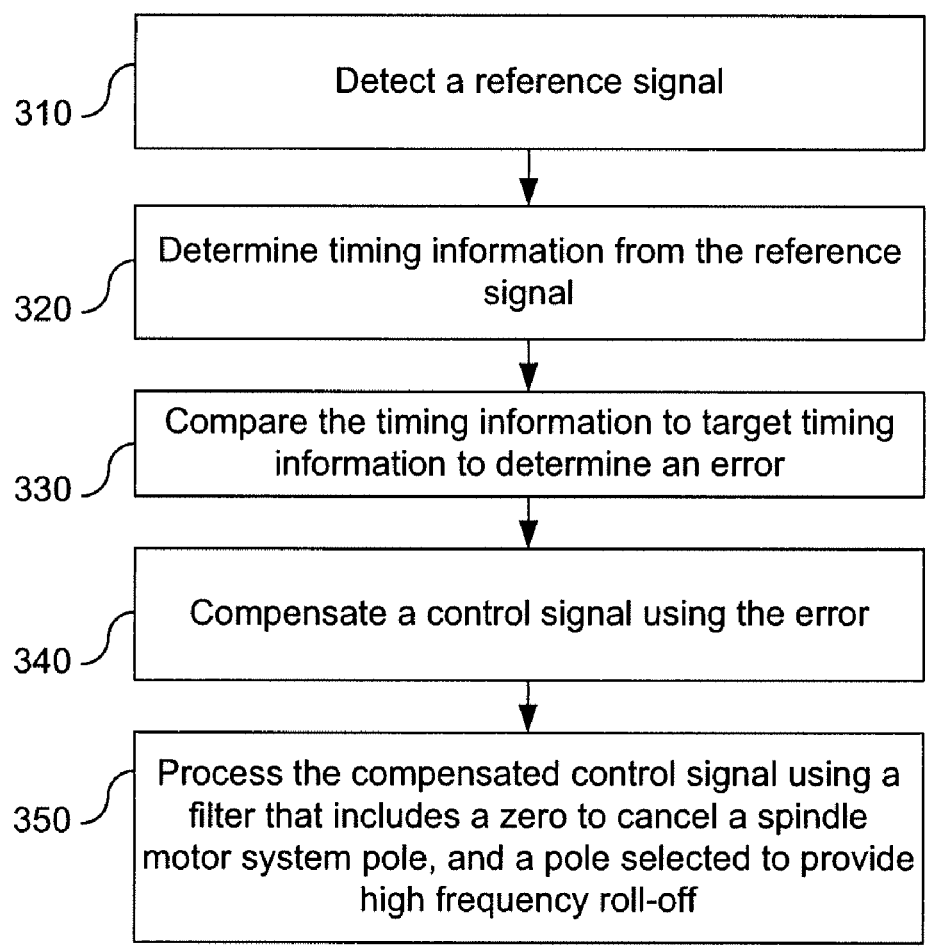
FIG. 3 is an example process for producing a filtered control signal.

FIG. 3 is an example process 300 for producing a filtered control signal. A reference signal is detected 310. Timing information is determined 320 from the reference signal. For example, the detector 220 can detect and determine timing information from the reference signal. The timing information is compared 330 to target timing information to determine an error. For example, the comparator 230 can compare timing information to target timing information to determine an error. As an example, the comparator 230 can compare a target timing mark interval 140 between a first sample (e.g., k=0) and a second sample (e.g., k=1) to the timing mark interval 170 to determine a spindle motor timing error (STE). As another example, the comparator 230 can compare the timing mark timestamp 120 to the expected target phase 130 at a third sample (e.g., k=2) to determine a spindle motor phase error (SPE). A control signal is compensated 340 using the error. For example, the compensator 240 can compensate a control signal using the error. The compensated control signal is processed 350 using a filter that includes a zero to cancel a spindle motor system pole, and a pole selected to provide high frequency roll-off. For example, the filter 250 can process the compensated control signal.

Figure 4B:
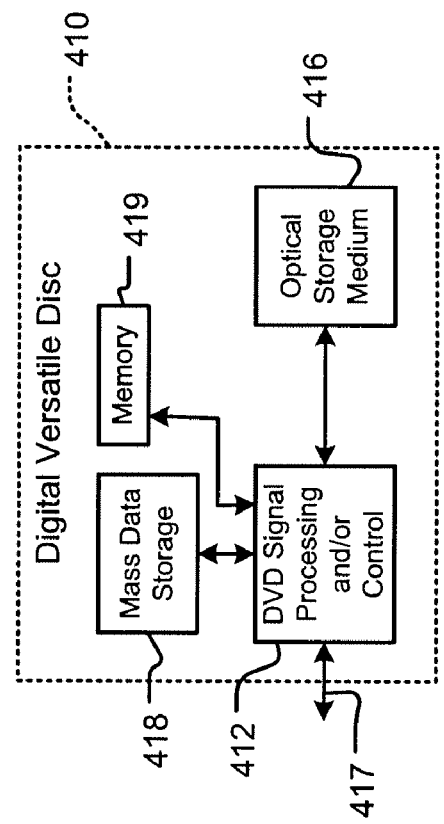
FIGS. 4A-4E show various example implementations of the described systems and techniques.
Figure 4A:
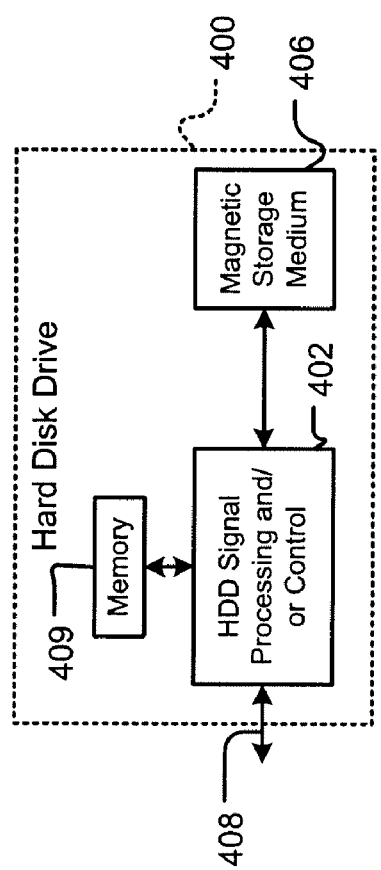

FIGS. 4A-4E show various example implementations of the described systems and techniques. Referring now to FIG. 4A, the described systems and techniques can be implemented in a hard disk drive (HDD) 400. The described systems and techniques may be implemented in either or both signal processing and/or control circuits, which are generally identified in FIG. 4A at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Referring now to FIG. 4B, the described systems and techniques can be implemented in a digital versatile disc (DVD) drive 410. The described systems and techniques may be implemented in either or both signal processing and/or control circuits, which are generally identified in FIG. 4B at 412, and/or mass data storage of the DVD drive 410. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 4A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 4C:
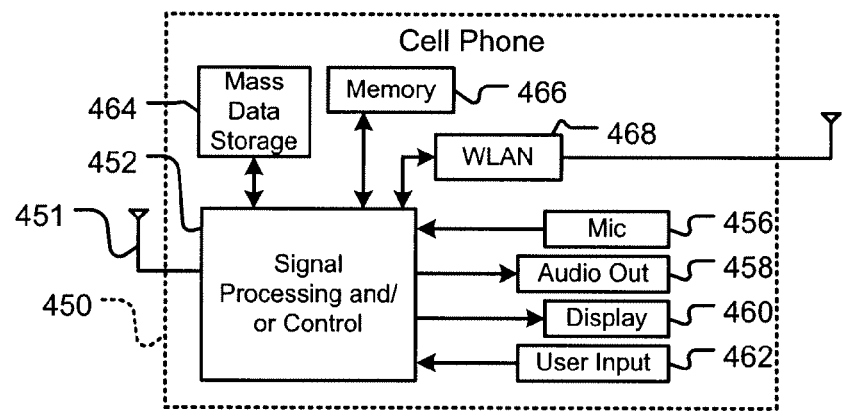

Referring now to FIG. 4C, the described systems and techniques can be implemented in a cellular phone 450 that may include a cellular antenna 451. The described systems and techniques may be implemented in either or both signal processing and/or control circuits, which are generally identified in FIG. 4C at 452, a WLAN interface and/or mass data storage of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN interface 468.

Figure 4D:
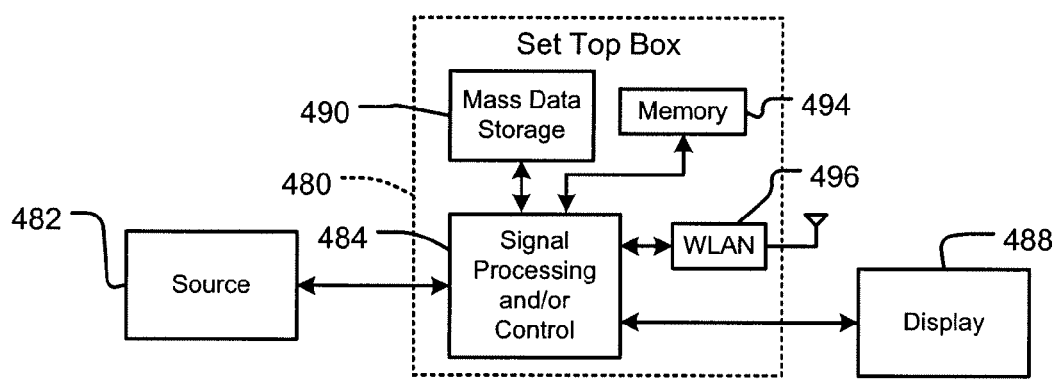

Referring now to FIG. 4D, the described systems and techniques can be implemented in a set top box 480. The described systems and techniques may be implemented in either or both signal processing and/or control circuits, which are generally identified in FIG. 4D at 484, a WLAN interface and/or mass data storage of the set top box 480. The set top box 480 receives signals from a source 482 such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices, for example, hard disk drives and/or DVD drives. At least one HDD may have the configuration shown in FIG. 4A and/or at least one DVD may have the configuration shown in FIG. 4B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN interface 496.

Figure 4E:
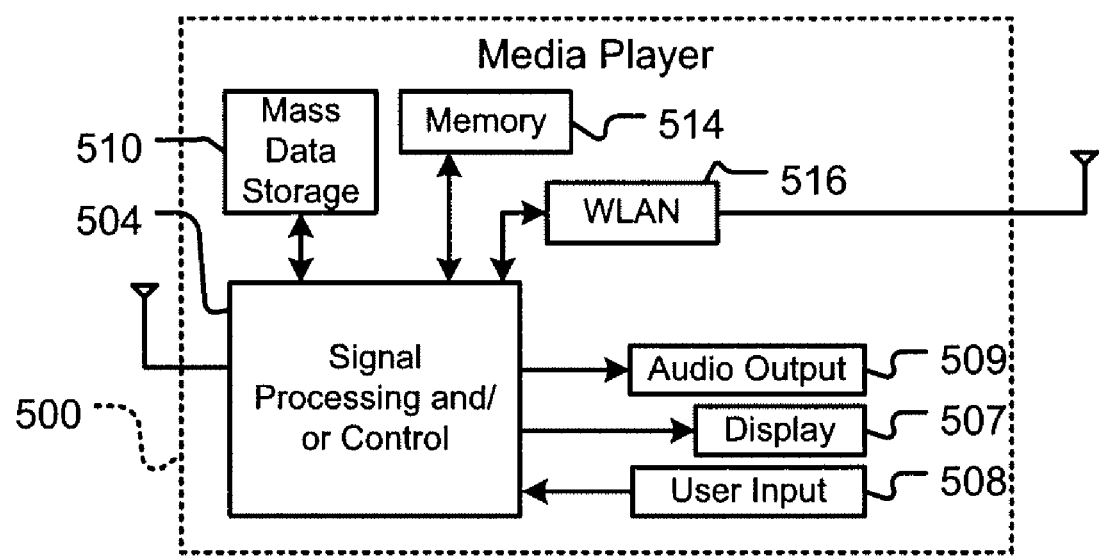

Referring now to FIG. 4E, the described systems and techniques can be implemented in a media player 500. The described systems and techniques may be implemented in either or both signal processing and/or control circuits, which are generally identified in FIG. 4E at 504, a WLAN interface and/or mass data storage of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN interface 516. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them. For example, the structural means disclosed in this specification and structural equivalents thereof, can include a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
   receiving a compensator output from a spindle motor controller that compensates for variations in a velocity of an associated spindle motor; and
   filtering the compensator output to compensate for a spindle motor system pole and produce a high frequency roll-off.

2. The method of claim 1, where the spindle motor controller includes a phase-locked-loop (PLL).

3. The method of claim 1, where the spindle motor controller includes a frequency-locked-loop (FLL).

4. The method of claim 1, where filtering includes using a zero to cancel an existing spindle motor system pole, and a pole selected to provide high frequency roll-off.

5. A method comprising:
   detecting a reference signal;
   determining timing information from the reference signal;
   comparing the timing information to target timing information to determine an error;
   compensating a control signal using the error; and
   processing the compensated control signal using a filter that includes a zero to cancel a spindle motor system pole, and a pole selected to provide high frequency roll-off.

6. The method of claim 5, further comprising:
   determining a zero to cancel the system pole; and
   determining the high frequency pole.

7. The method of claim 5, where processing the compensated control signal increases a precision and a bandwidth of a plant transfer function, and the plant transfer function is based on the filtered control signal, where the plant is a spindle motor.

8. The method of claim 5, where the reference signal includes back-electromotive-force pulses from a spindle motor.

9. The method of claim 5, where the timing information includes timing mark intervals and the target timing information includes target timing mark intervals.

10. The method of claim 9, where the timing mark intervals and the target timing mark intervals define velocity.

11. The method of claim 5, where the timing information includes timestamps and the target timing information includes expected target phases.

12. The method of claim 11, where the timestamps and the expected target phases define frequency.

13. A filter comprising:
   a zero to cancel a system pole of a plant transfer function;
   a high frequency pole to increase the bandwidth of the plant transfer function wherein the plant transfer function is a transfer function associated with a compensator output from a spindle motor controller that compensates for variations in a velocity of a spindle motor; and
   a unity gain.

14. A system comprising:
   a spindle motor;
   a detector to detect a reference signal and determine timing information from the reference signal;
   a comparator to compare the timing information to target timing information to determine an error;
   a compensator to compensate a control signal using the error; and
   a filter, to process the compensated control signal, that includes a zero to cancel a spindle motor system pole and a pole selected to provide high frequency roll-off.

15. The system of claim 14, further comprising:
   a spindle motor controller that includes a phase-locked-loop (PLL).

16. The system of claim 14, further comprising:
   a spindle motor controller that includes a frequency-locked-loop (FLL).

17. The system of claim 14, where the filter includes a zero to cancel an existing spindle motor system pole, and a pole selected to provide high frequency roll-off.

18. The system of claim 14, where the filter processes the compensated control signal to increase a precision and a bandwidth of a plant transfer function, and the plant transfer function is based on the filtered control signal, where the plant is the spindle motor.

19. The system of claim 14, where the detector detects back-electromotive-force pulses from the spindle motor.

20. The system of claim 14, where the comparator compares timing mark intervals to target timing mark intervals, and the timing mark intervals and the target timing mark intervals define velocity.

21. The system of claim 14, where the comparator compares timestamps and expected target phases, and the expected target phases define frequency.

* * * * *